Jan 6, 1931.  O. U. ZERK  1,787,770
AUTOMATIC LUBRICANT CUP AND THE LIKE
Original Filed July 5, 1923
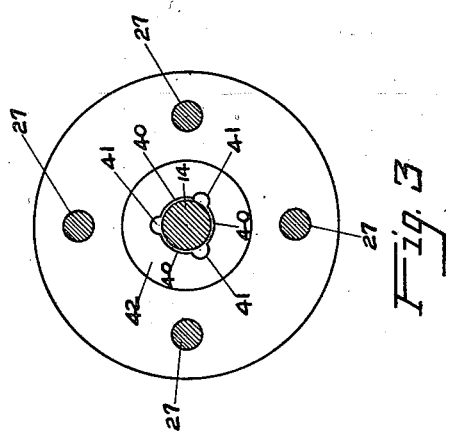
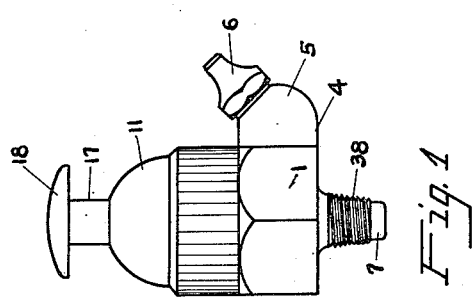
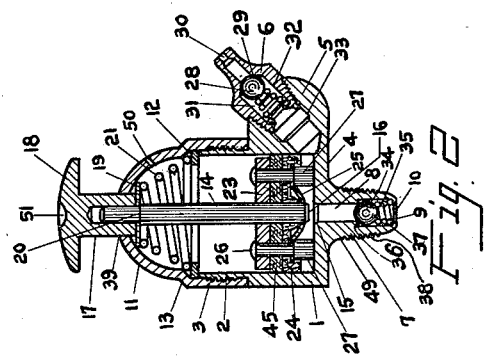
INVENTOR.
Oscar Ulysses Zerk
BY
Richey, Slough & Watts
ATTORNEYS.

Patented Jan. 6, 1931

1,787,770

UNITED STATES PATENT OFFICE

OSCAR ULYSSES ZERK, OF CLEVELAND, OHIO, ASSIGNOR, BY MESNE ASSIGNMENTS, TO THE ALEMITE CORPORATION, OF CHICAGO, ILLINOIS, A CORPORATION OF DELAWARE

AUTOMATIC LUBRICANT CUP AND THE LIKE

Original application filed July 5, 1923, Serial No. 649,703. Divided and this application filed January 2, 1924. Serial No. 683,973.

My invention relates to automatic lubricant cups and particularly to lubricant cups which are adapted to be permanently secured to adjacent machine bearings such as the bearings of an automobile.

An object of my invention is to provide such lubricant cups as are adapted to be charged with grease or oil or other lubricating material and which may be subsequently discharged at intervals to the bearing surfaces, such discharging being accomplished at relatively high pressure.

Another object of my invention is to provide such lubricant cups which may be charged by a lubricant pump or gun which is capable of injecting the lubricant into the cup under pressure.

Another object of my invention is to provide a lubricant storing and dispensing apparatus which, during the active charging of the same with lubricant under pressure, will permit a portion of the lubricant to pass to the bearing surfaces and the rest of the lubricant, comprising the charge, to be stored within the apparatus for subsequent ejection to the bearing surfaces from the apparatus.

Another object of my invention is to provide an automatic lubricant containing and dispensing cup which will operate to discharge a predetermined amount of lubricant to the bearing surfaces at each like operation of the discharging means therefor and to prevent the inclusion of air with the lubricant during or subsequent to such discharging operation.

Other objects of my invention and the invention itself will be clear from the drawings accompanying this specification and the description of the said drawings contained herein.

Referring to the drawings:

Fig. 1 shows a side elevational view of a lubricant cup embodying the principles of my invention.

Fig. 2 shows a vertical medial sectional view of the embodiment shown in Fig. 1.

Fig. 3 is a bottom plan view of a special washer employed in connection with my invention.

Referring now to the drawings, at 1 I show a casing having cylindrical side walls 2, the upper outer wall thereof being of reduced diameter and externally threaded as shown at 3. The casing 1 has a bottom wall 4 extending laterally from the lower portion of the casing 1 and above the bottom wall 4 is a lug 5 perforated and the perforation internally threaded for the reception of a lubricant receiving nipple 6.

The bottom wall 4 also has a downwardly extending externally threaded stem 7, the stem 7 having an axial bore 8 having cylindrical side walls and a valve chamber 9 communicating with and disposed below the said bore 8, there being an orifice 10 below the said chamber through which lubricant may pass from the valve chamber to a bearing to be lubricated. At 11 I provide a cover for the cup, said cover having its inner surface adjacent its lower rim internally screw threaded to co-operate with the threads 3 on the casing, whereby the cover 11 may be screwed tightly down onto the casing.

A washer 12 is clamped between the top rim of the casing 1 upon which it rests and a clamping seat 13 on the cover 11 above the threaded portion thereof. At 14 I show a plunger axially in alignment with the bore 8 of the stem 7 but normally disposed above the orifice 15 of the bottom wall 4 for such bore, the diameter of the plunger 14, except at its beveled end 16, being nearly the same though somewhat smaller than the diameter of the cylindrical bore 8 whereby the plunger 14, when depressed, as will be later described, and caused to enter the bore 8, will make a tight substantially leak-proof fit with the cylindrical walls of the bore 8. The other end of the plunger 14 has rigidly affixed thereto a handle 17 and an enlarged knob 18.

A washer 19 is clamped tightly against the lower marginal portion of the end of the handle 17 by a shoulder 20 on the upper end of the plunger 14.

Disposed between the washers 19 and 12 of the upper portion of the cups and within the cover 11, I provide a frustro conical shaped coiled compression spring 21, the smaller end of the said spring pressing upwardly against the washer 19, the lower larger portion resting on the upper surface of the washer 12. This construction maintains the plunger 14 in its uppermost position with the outer upper edge of the washer 19 in engagement with the upper adjacent portions of the cover 11.

Within the casing 1, I provide a movable wall, said movable wall comprising a metallic washer 23, a cork washer 45, a leather washer 24, a metal washer of special construction later to be described and shown in Fig. 2 at 25, and the clamping studs 26 having enlarged lower ends and making a tight fit therewith so as to secure the special washer 25, the cork washer, the leather washer, and the metal washer 23 tightly together. The lower ends 27 of the studs 26 project beyond the washer 25 and serve to limit the downward movement of the movable wall.

The nipple 6 is provided with an inlet orifice 30 and a ball valve 28 held by a spring 31 on a seat 29. The valve chamber 32 and interconnecting passageway 33 lead directly to the interior of the casing 1 below the movable wall. A similar ball valve employing a ball 34 and spring 35 is positioned below the cylindrical bore 8 of the stem 7 and bottom wall 4, the ball seat being shown at 36 and the spring 35 which engages the ball 34 to restore it against such seat resting at its outer end against an inwardly extending flange 37.

It will be understood that the external threads 38 on the stem 7 permit the entire lubricant containing and dispensing cup to be secured to a shackle bolt or other machine part having bearing surfaces to be lubricated.

The operation of my invention is as follows:

In order to charge the lubricant containing cup with a lubricant such as grease, a grease gun, preferably one capable of delivering grease into the nipple 6 through its orifice 30 at high pressure, is brought into discharging relation to the said nipple and the lubricant from the gun is ejected through the said orifice 30 displacing the ball valve 28 against the force of the spring 31 and through the passageway 33 into the space below the movable wall on the interior of the casing 1. This lubricant will fill the space below the movable wall and lift said wall until the metal washer 23 engages washer 12. Thereafter lubricant will be forced directly to the bearing surface to be lubricated.

After the machine has been in use for some time and the bearing needs additional lubricant, the same can be then supplied from the space below the movable wall by manually depressing the knob 18, thus causing the plunger 14 to pass through the orifice 15 of the bore 8 and to trap the lubricant contained in the bore 8 and push it past the valve 34.

This lubricant ejected by means of the plunger 14 will be ejected at a very high pressure and at a pressure sufficient to cause the lubricant to reach the bearing surfaces, forcing ahead of it old, congealed, gummed lubricant mixed with dirt and dust from the bearing surfaces, such old lubricant being replaced by new lubricant.

After such an operation the spring 21 will restore the plunger 14 and the rigidly secured knob handle 18 to their normal position shown in Fig. 2 and the ball valve 34 immediately closes when the plunger 14 begins its restoring movement. A partial vacuum will first be created in the bore 8 and then as the power of the spring 21 is greater than the atmospheric pressure tending to prevent the withdrawal of the plunger 14, the plunger will be entirely retracted and when the end 16 thereof is lifted above the orifice 15, by virtue of the partial vacuum created in the bore 8, a fresh charge of lubricant will be caused to enter the bore 8 through the orifice 15 and below the beveled end of the plunger 14. The apparatus is now ready for another operation.

It will be noted that the plunger 14 is maintained in vertical axial alignment relative to the walls of the bore 8 by the handle shank 17 having its outer walls engaged by the inner walls of the opening 39 in the cover 11, and also by the plunger. It will be noted that the leather washer 24 is turned downwardly at its periphery so that it will exert outward pressure against the inner walls of the casing 1 and that its inner portion is likewise bowed downwardly so as to exert a lateral inward pressure against the plunger 14.

This construction insures that there will be a tight leak-proof joint to prevent the loss of lubricant from the chamber below the movable wall to the space thereabove. The washer 25, as has been said, is of special construction, being dished in its interior portion and as shown in Fig. 3, which shows a plan view, its interior downwardly dished portion 42 is perforated irregularly, there being spaced portions in the perforation shown at 40 whose edges define portions of a circle. The intermediate portions 41 extend outwardly from the center of the aperture. In Figure 2 the plunger 14 is shown in section and it will be seen that the edge portions of the perforation 40 serve to help to preserve alignment of the plunger 14 and the movable wall, the openings through the portion 42 providing openings from the space below the washer 25 to the space thereabove and adjacent to the leather washer 24, to permit lubricant to pass freely to the lower face of such washer, which maintains a tight seal against the walls of the plunger 14 and the walls 2 of the casing.

The leather washer is turned downward at its sealing edges, the larger metal clamping washer 23 and the cork washer being disposed above it, and the clamping washer 25, which has just been described, being disposed below it. The downwardly bent inner marginal portions of the leather washer 24 are received within the downwardly dished portion 42 of such smaller clamping washer. The cork and leather movable wall as shown makes an especially good seal against the leakage of lubricant, cork being a good material to prevent loss of lubricant by capillary attraction. This construction makes the movable wall lubricant leakproof against high lubricant pressure exerted from below the piston as when a high pressure grease gun is applied to the nipple 6, forcing the movable wall upwardly with its marginal downturned edges tightly pressed by the lubricant against the walls of the casing 1, and against the walls of the plunger 14. The movable wall makes a sufficiently tight contact against such walls when such member is pressed downwardly by the excess of atmospheric pressure on its upper side, subsequent to an ejection of lubricant to the bearing by downward movement of the plunger 14 through the cylindrical bore 8, as has been described. In the previous description of the operation of the lubricator of my invention, the term "partial vacuum" has been used in describing that force which draws the movable wall downwardly in close contact with the body of lubricant contained in the reservoir after the ejection of a charge of lubricant into the reservoir by means of the plunger 14.

As I understand the phenomena, the movable wall is really pressed down by the atmospheric pressure on its upper side, maintained by virtue of the free passage of air into the upper chamber above the movable wall through the joint 39 and the opening 50, when the hydraulic pressure below the movable wall is reduced below that of the atmosphere by withdrawl of lubricant. In any event, I find that the movable wall always closely follows the lubricant downward until substantially all of the lubricant has been ejected from the reservoir below the movable wall.

The ends 27 of the spacing studs 26 carried on the movable wall prevent the closure of the port to the passage way 33 in the wall 2 of the casing 1.

It will be noted that I so position the charging nipples that when the charging of such lubricators is accomplished by a "press-on" lubricant charging gun, such as that, for instance, illustrated in my Patent No. 1,475,980, dated December 4, 1923, the manual pressure exerted against the end of the nipple will be directed toward the lowermost point of support for the stem 7 of the lubricator casing so that such a charging effort will not tend to push the lubricator out of the bearing casing recess into which it is fitted, but will have the opposite effect of tending to lodge it more firmly in such bearing casing recess. This is of particular advantage when, as contemplated, I may omit the screw threads on the outer surface of the lubricator stems 7, relying upon a light press fit to force such lubricator into the bearing casing recesses receiving such stem.

Referring particularly to Fig. 2, at 50 I show a small opening through the cover 11, said opening serving to insure that the space above the movable wall is always maintained at atmospheric pressure instead of relying upon the relatively loose fit between the handle shank 17 and the cover 11. Also, in Fig. 2 I show a recess 51 for the knob handle 18, into which recess the operator may project a screw driver or like tool in order to depress the plunger 14 to lubricate the bearings.

The knob 18 may be of such material and of such weight that the lubricator is capable of being actuated automatically when the lubricator is vibrated as when attached to a vehicle vibrating by being driven over a rough road.

This application is a division of my pending application, Serial No. 649,703, filed July 5, 1923, entitled Automatic lubricant cups.

Having thus described my invention, I am aware that numerous and extensive departures may be made from the embodiments herein illustrated and described and mentioned, but without departing from the spirit of my invention.

What I claim is:

1. A lubricant feeding device comprising a receptacle, a movable wall dividing said receptacle into two non-communicating compartments, one of said compartments providing a lubricant reservoir and the other of said compartments being open to the atmosphere, an outlet conduit adapted to be fitted to an element to be lubricated, said reservoir compartment having an inlet passage extending through the wall thereof adjacent the outlet conduit, an automatic valve for closing the inlet passage in said compartment, a slidably mounted plunger extending into said receptacle and through said movable wall, and handle means for reciprocating said plunger, to displace lubricant from said outlet conduit, said conduit being charged from said reservoir compartment when said plunger is removed from said conduit.

2. A lubricating feeding device comprising a receptacle, a movable wall dividing said receptacle into two non-communicating compartments, one of said compartments providing a lubricant reservoir and the other of said compartments being open to the atmosphere, an outlet conduit adapted to be fitted to an element to be lubricated, said reservoir compartment having an inlet passage extending through the wall thereof adjacent the outlet conduit, an automatic valve for closing the inlet passage in said compartment, a slidably mounted plunger extending into said receptacle and through said movable wall and adapted to displace lubricant from said outlet conduit, said conduit being charged from said reservoir compartment when said plunger is removed from said conduit, and a handle for said plunger, said handle having a recess therein within which an operating element can be seated to manually reciprocate said plunger.

3. A lubricant feeding device comprising a receptacle having an outlet, a weight, means actuated by reciprocation of said weight for ejecting a charge of lubricant upon each reciprocation of said weight relatively to said receptacle, and means in said receptacle for keeping a mass of lubricant therein away from said weight, said weight being externally accessible for manual actuation of said ejecting means.

4. A lubricant feeding device comprising a receptacle having an outlet, a weight, means actuated by relative reciprocation of said weight and receptacle for ejecting lubricant, and means in said receptacle for keeping a mass of lubricant therein away from said weight, said weight being externally accessible for manual actuation of said ejecting means.

5. A lubricant feeding device comprising a receptacle having an outlet, a plunger movable into and out of said outlet upon relative reciprocation of said receptacle and plunger, check valve means in said outlet to enable said plunger to develop a vacuum and suck lubricant out of said receptacle, a weight on said plunger, and a movable partition for keeping a mass of lubricant in said receptacle out of contact with said weight, said plunger being externally accessible for manual actuation.

In testimony whereof I hereunto affix my signature this 29 day of December, 1923.

OSCAR ULYSSES ZERK.

CERTIFICATE OF CORRECTION.

Patent No. 1,787,770.   Granted January 6, 1931, to

OSCAR ULYSSES ZERK.

It is hereby certified that the assignee in the above numbered patent was erroneously described and specified as "The Alemite Corporation", whereas said assignee should have been described and specified as Alemite Corporation; page 3, line 40, for the misspelled word "withdrawl" read withdrawal; same page, line 113, claim 1, after "plunger" strike out the comma, and line 117, claim 2, for "lubricating" read lubricant; and that the said Letters Patent should be read with these corrections therein that the same may conform to the record of the case in the Patent Office.

Signed and sealed t his 17th day of Februar y ,  A. D. 1931 .

(Seal)

M. J. Moore,
Acting Commissioner of Patents.